252-8.51 SR
A5596 OR T 103,902

United States Defensive Publication [19] (H) [11] T103,902
Dart et al. [43] Feb. 7, 1984

[54] DRILLING FLUID UTILIZING GRANULAR STARCH FOR FLUID LOSS CONTROL

[76] Inventors: Norman K. Dart, 905 Dee Lee La., Mt. Zion, Ill. 62549; James E. Eastman, 345 S. Westdale Ave., Decatur, Ill. 62522

[21] Appl. No.: 438,089

[22] Filed: Nov. 1, 1982

[51] Int. Cl.[3] ..... C09K 7/00; C13L 1/00; E21C 7/06; E21C 7/08

[52] U.S. Cl. ..... 252/8,5 C; 175/65; 127/70

[57] ABSTRACT

An improved aqueous drilling fluid having low fluid loss and effective viscosity control is obtained by the addition of a cold-water-swelling granular corn starch material which consists essentially of substantially intact, partially swollen granules which appear nonbirefringent under a polarizing microscope and which have a cold-water solubility of at least 50%. The improved drilling fluids exhibit better controlled fluid loss and viscosity stability at temperatures up to 250° F. than do drilling fluids containing most present commercially available starch-based fluid loss control agents.

8 Claims, No Sheets Drawing,

25 Pages Specification

The file of this unexamined application may be inspected and copies thereof may be purchased (849 O.G. 1221, Apr. 9, 1968).